(12) United States Patent
Hadani et al.

(10) Patent No.: US 10,355,887 B2
(45) Date of Patent: Jul. 16, 2019

(54) ITERATIVE TWO DIMENSIONAL EQUALIZATION OF ORTHOGONAL TIME FREQUENCY SPACE MODULATED SIGNALS

(71) Applicant: Cohere Technologies, Inc., Santa Clara, CA (US)

(72) Inventors: Ronny Hadani, Santa Clara, CA (US); Shachar Kons, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/148,922

(22) Filed: Oct. 1, 2018

(65) Prior Publication Data

US 2019/0036741 A1 Jan. 31, 2019

Related U.S. Application Data

(63) Continuation of application No. PCT/US2017/025578, filed on Mar. 31, 2017.

(Continued)

(51) Int. Cl.
*H04L 25/02* (2006.01)
*H04L 25/03* (2006.01)
(Continued)

(52) U.S. Cl.
CPC ........ *H04L 25/03012* (2013.01); *H04L 1/005* (2013.01); *H04L 1/0054* (2013.01);
(Continued)

(58) Field of Classification Search
USPC .................................. 375/235, 346; 370/329
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21, 2017, 6 pages.

(Continued)

*Primary Examiner* — Eva Y Puente
(74) *Attorney, Agent, or Firm* — Perkins Coie LLP (57) ABSTRACT

An iterative two dimension equalizer usable in a receiver of orthogonal time frequency space (OTFS) modulated signals is described. In one configuration of the equalizer, a forward path generates, from received time-frequency domain samples and a channel estimate, estimates of data bits and likelihood numbers associated with the estimates of data bits, generated by delay-Doppler domain processing. In the feedback direction, the estimates of data bits are used to generate symbol estimates and autocorrelation matrix estimate in the time domain. In another configuration, a soft symbol mapper is used in the feedback direction for directly generating the feedback input symbol estimate without having to generate estimates of data bits.

23 Claims, 6 Drawing Sheets

Related U.S. Application Data (60) Provisional application No. 62/317,420, filed on Apr. 1, 2016.

(51) Int. Cl.
  *H04L 25/00* (2006.01)
  *H04L 25/08* (2006.01)
  *H04L 1/00* (2006.01)
  *H04L 27/26* (2006.01)

(52) U.S. Cl.
  CPC .......... *H04L 25/00* (2013.01); *H04L 25/0208* (2013.01); *H04L 25/03159* (2013.01); *H04L 25/03178* (2013.01); *H04L 25/03286* (2013.01); *H04L 25/03318* (2013.01); *H04L 25/08* (2013.01); *H04L 27/2639* (2013.01); *H04L 27/2647* (2013.01); *H04L 25/0212* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,646,833 B1 * | 1/2010 | He .................. H04L 25/022 348/607 |
| 7,689,049 B2 | 3/2010 | Monro |
| 7,773,685 B2 | 8/2010 | Tirkkonen et al. |
| 7,864,836 B1 * | 1/2011 | Zhidkov ............ H04L 25/0216 375/229 |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |

(56) References Cited

U.S. PATENT DOCUMENTS

| | | |
|---|---|---|
| 2013/0083661 A1 | 4/2013 | Gupta et al. |
| 2013/0121497 A1 | 5/2013 | Smaragdis et al. |
| 2013/0163542 A1* | 6/2013 | Fettweis ............ H04W 72/044 370/329 |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0310510 A1* | 10/2017 | Hidaka ............ H04L 25/03057 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 4, 2016, 13 pages.

Office Action for U.S. Appl. No. 15/152,464, dated Apr. 6, 2017, 10 pages.

Examination Report No. 1 for Australian Application No. 2013280487, dated May 2, 2016, 3 pages.

International Search Report and Written Opinion for International Application No. PCT/US2016/031928, dated Oct. 7, 2016, 10 pages.

Office Action for U.S. Appl. No. 15/188,946, dated May 8, 2017, 14 pages.

International Search Report and Written Opinion for International Application No. PCT/US2016/038584, dated Sep. 26, 2016, 8 pages.

Office Action for U.S. Appl. No. 15/187,668, dated Feb. 16, 2017, 6 pages.

International Search Report and Written Opinion for International Application No. PCT/US2016/031909, dated Aug. 11, 2016, 13 pages.

Office Action for U.S. Appl. No. 15/194,494, dated May 5, 2017, 16 pages.

International Search Report and Written Opinion for International Application No. PCT/US2016/039662, dated Nov. 29, 2016, 14 pages.

Office Action for U.S. Appl. No. 15/436,653, dated Jun. 2, 2017, 10 pages.

Office Action for U.S. Appl. No. 15/208,545, dated Aug. 21, 2017, 15 pages.

International Search Report and Written Opinion for International Application No. PCT/US2016/041940, dated Oct. 20, 2016, 8 pages.

Supplementary European Search Report for European Application No. 13768150.8, dated Oct. 30, 2015, 7 pages.

International Search Report and Written Opinion for International Application No. PCT/US2013/033652, dated Jun. 12, 2013, 8 pages.

International Search Report and Written Opinion for International Application No. PCT/US2015/041417, dated Oct. 1, 2015, 7 pages.

Office Action for U.S. Appl. No. 14/805,407, dated Dec. 14, 2016, 7 pages.

International Search Report and Written Opinion for International Application No. PCT/US2015/041420, dated Oct. 1, 2015, 6 pages.

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

(56) References Cited

OTHER PUBLICATIONS

Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att introduces_new_concepts_for_telecom_network_html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 in: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," in: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

* cited by examiner

ITERATIVE TWO DIMENSIONAL EQUALIZATION OF ORTHOGONAL TIME FREQUENCY SPACE MODULATED SIGNALS

CROSS-REFERENCE TO RELATED APPLICATIONS

This patent document claims priority to U.S. Provisional Application Ser. No. 62/317,420, entitled "ITERATIVE TWO DIMENSIONAL EQUALIZATION OF ORTHOGONAL TIME FREQUENCY SPACE MODULATED SIGNALS", filed on Apr. 1, 2016. The entire content of the aforementioned patent application is incorporated by reference herein.

TECHNICAL FIELD

The present document relates to wireless communication, and more particularly, to receiver-side processing of orthogonal time frequency space (OTFS) domain modulated signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses receiver-side techniques for iterative two-dimensional channel equalizer in which input time-frequency domain train of symbols and channel estimates are, in a feed forward path, transformed into delay-Doppler domain and data bits are extracted in the delay-Doppler domain. In the feedback path, the data bit estimates are transformed using a symplectic Fourier transform into time-frequency domain to generate symbol estimates for the next iteration.

In one example aspect, a wireless communication method for recovering information bits from a received signal, by performing iterative two dimensional equalization is disclosed. The method includes receiving, at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing, from the iteration inputs, a Wiener estimate of the stream of received symbols, transforming the Wiener estimate to symbol estimates a two dimensional delay-Doppler grid using a two-dimensional symplectic Fourier transform, estimating likelihoods of the symbol estimates in the two dimensional delay-Doppler grid, and generating estimates of data from the likelihoods.

In another example aspect, a wireless communication method for recovering information bits from a received signal, by performing iterative two dimensional equalization is disclosed. The method includes receiving, at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing, from the iteration inputs, a Wiener estimate of the stream of received symbols, transforming the Wiener estimate to symbol estimates a two dimensional delay-Doppler grid using a two-dimensional symplectic Fourier transform, and processing in a feedback direction, by generating a symbol estimate and an input autocorrelation matrix estimate for a next iteration.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

Section headings are used in the present document, including the appendices, to improve readability of the description and do not in any way limit the discussion to the respective sections only.

Figure 1:
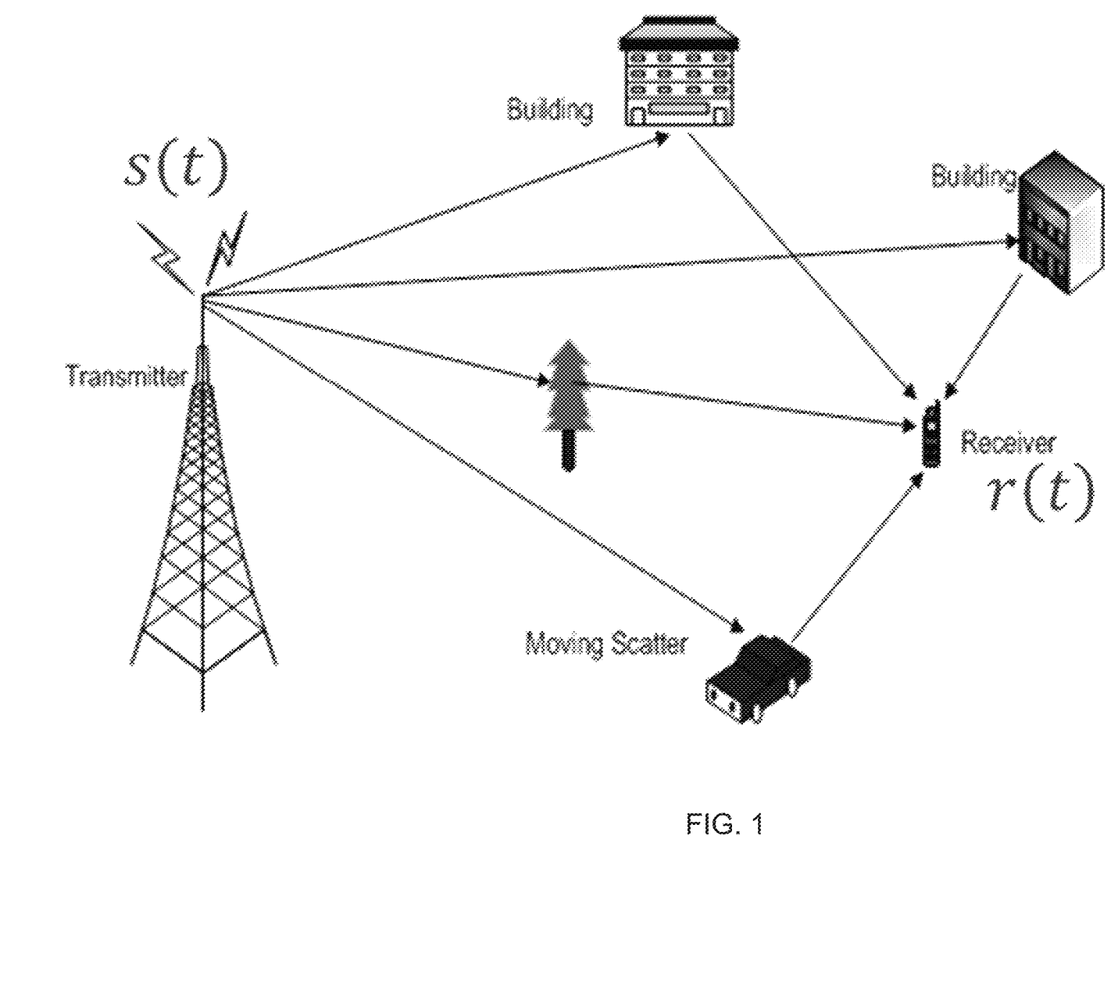
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102, or in the base station.

A 2-D equalizer may be used to extract data bits that are modulated on symbols received via OTFS modulation.

1. Introduction

A system with N transmit antennas and M receives antennas, is used to pass information over a multipath channel Information bits, b, are encoded into coded bits, c, using an Forward Error Correction (FEC) code (such as convolutional code, turbo code or LDPC code). These coded bits are grouped into groups of q bits, optionally interleaved and mapped to symbols x in a finite constellation $\Omega$ (such as $2^q$-QAM) multiplexed on a grid on the 2-D Delay Doppler grid. These symbols are transformed by a 2-D Inverse Symplectic Fourier transform to symbols X multiplexed on a reciprocal grid on the time frequency plane. These symbols are OFDM modulated and transmitted over the N antennas. The signal, received in M antennas, is OFDM demodulated and processed as a 2-D Time-Frequency grid in the receiver. In the 2-D Time-Frequency grid, the channel equation can be written individually for each symbol (or time-frequency point) indexed by (i, j) as $$Y_{M\times 1}^{(i,j)} = H_{M\times N}^{(i,j)} \cdot X_{N\times 1}^{(i,j)} + W_{M\times 1}^{(i,j)} \quad (1)$$

where $W_{M\times 1}^{(i,j)}$ represent a vector of AWGN samples with expectation zero and variance $R_W$. The 2-D equalizer computes estimations of the transmitted symbols $\hat{x}$ from the received samples Y, the channel estimations H and the noise variance $R_W$. In a non-iterative receiver, the estimated samples are transformed to the Delay-Doppler domain via a 2-D Symplectic Fourier transform and then converted to bit likelihoods, which are passed to FEC decoder to generate estimates, $\hat{b}$, on the information bits.

2. Iterative 2-D Equalizer

Figure 5:
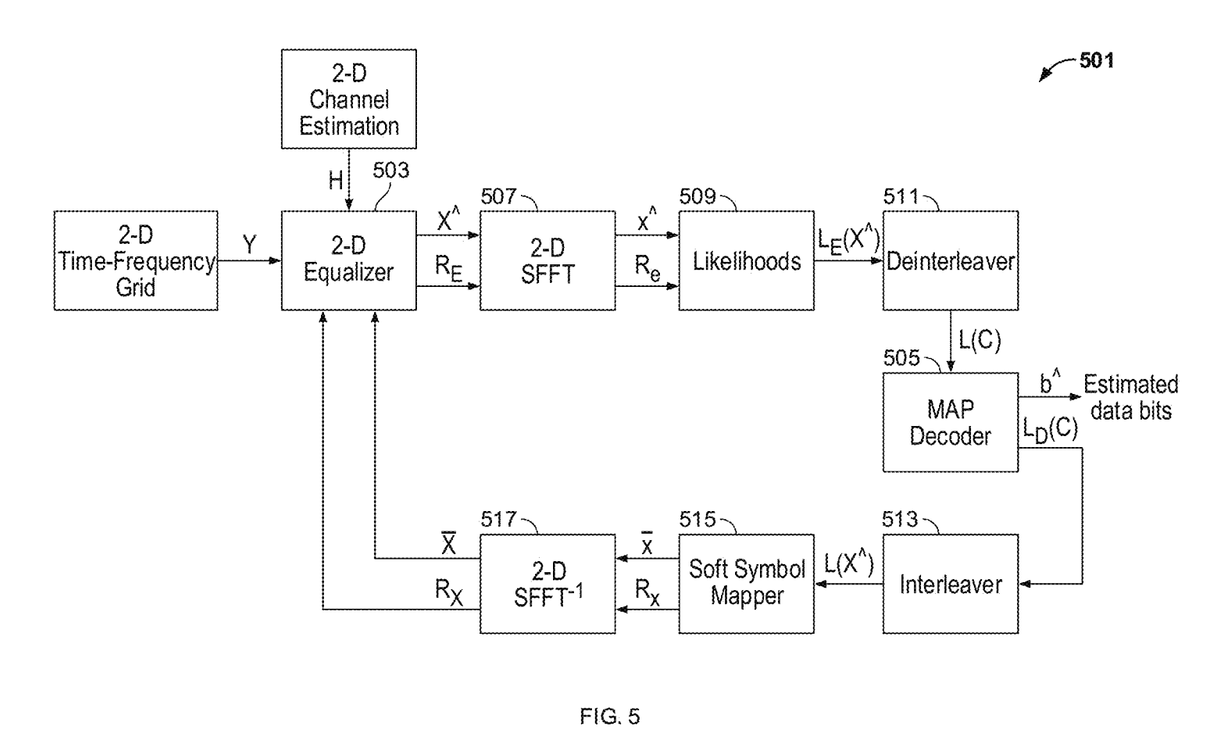
FIG. 5 is a block diagram showing an example 2-D iterative equalizer.

FIG. 5 is a block diagram of an example embodiment of an iterative 2-D equalizer 501. The 2-D Iterative equalizer, illustrated in FIG. 5, iterates between the 2-D equalizer 503 and the FEC MAP decoder 505, by passing information from one to the other. After several iterations, the MAP decoder outputs estimation on the information bits. In various embodiments, the iteration termination criteria may be based on a total number of iterations, meeting, but not exceeding, a time budget for the iterative process, the improvement in successive iterations falling below a threshold, and so on.

2.1 Example Embodiments of the 2-D Equalizer (503)

In some embodiments, the 2-D equalizer may be implemented as an affine MMSE equalizer, computing the Wiener estimator of X $$\hat{X} = CY + (I-CH)\bar{X} \quad (2)$$

where $C = R_{XY} R_Y^{-1}$ and I is the identity matrix. Note that C is a function of $R_X$ and $R_W$. For the first iteration there is no prior information on the symbols of X, therefore we set $\bar{X}=0$ and $R_X=I$. The 2-D equalizer also computes the variance of the estimation error, denoted as $R_E$.

2.2 2-D SFFT (507)

The estimated symbols and error variances, $\hat{X}$ and $R_E$ respectively, are transformed from the 2-D Time-Frequency grid to the 2-D Delay-Doppler grid via a 2-D Symplectic Fourier transform to $\hat{x}$ and $R_e$ respectively.

2.3 Likelihoods (509)

Likelihoods for the coded bits $L_E(\hat{x})$, are computed from the symbols $\hat{x}$. Gaussian distribution may be assumed for $\hat{x}$ and the likelihoods can be derived from it. The probabilities for this case are $$P(\hat{x}|x=\omega) \propto e^{-\frac{1}{R_Z}(\hat{x}-\mu(\omega,A))^2} \quad (3)$$

where $\omega \in \omega$ is a constellation symbol and $A = 1 - R_e R_X^{-1}$ $R_Z = A R_e$ $\mu(\omega, A) = \omega A + (1-A)\bar{x} \quad (4)$ Note that $\bar{x}$ is defined in equation (7). For each symbols, the extrinsic coded bits log likelihoods ratio (LLR) can be derived as $$L_E(\hat{x})_i = \log\left(\frac{\sum_{\omega:s(\omega)_i=1} P(\hat{x}|x=\omega)\cdot \prod_{j\neq i} P(\omega)_j}{\sum_{\omega:s(\omega)_i=0} P(\hat{x}|x=\omega)\cdot \prod_{j\neq i} P(\omega)_j}\right) \quad (5)$$

where i,j=0, . . . , q−1, s($\omega$) is the constellation bits label that is associated with the constellation symbol $\omega$ and $P(\omega)_j$ is defined in equation (6).

2.4 Deinterleaver (511)

The deinterleaver permutes the likelihoods $L_E(\hat{x})$ to L(C). These likelihoods will be used as a priori information for the MAP decoder. In some implementations this deinterleaver might be optional.

2.5 MAP Decoder (505)

The Maximum A Posteriori decoder computes the a posteriori probabilities (APP's) of the information bits and also the extrinsic probabilities for the coded bits, which when using LLRs, are the APP's minus the a priori inputs.

2.6 Interleaver (513)

The interleaver permutes the likelihoods $L_D(C)$ to $L(\hat{x})$. These likelihoods will be used as a priori information for the MAP decoder. Note that in some implementations this interleaver might be optional.

2.7 Symbol Mapper (515)

The symbol mapper estimates the probabilities of each constellation symbol $\omega \in \Omega$ from the likelihoods values $L(\hat{x})$:

$$P(\omega)_j \cong \frac{1}{2}\left(1 + (2\cdot s(\omega)_j - 1)\cdot \tanh\left(\frac{L(\hat{x})_j}{2}\right)\right) \quad (6)$$

$$P(\omega) \cong \prod_{j=0}^{q-1} P(\omega)_j$$

These probabilities are used for computing the expectation of the constellation and the variance:

$$\bar{x} = \sum_{i=0}^{q-1} \omega \cdot P(\omega) \quad (7)$$

$$R_x = \sum_{i=0}^{q-1} \omega \omega^H P(\omega) - \bar{x}\bar{x}^H$$

2.8 2-D SFFT$^{-1}$ (517)

The 2-D Delay-Doppler domain symbols' expectation and variance $\bar{x}$ and $R_x$ are transformed to $\bar{X}$ and $R_x$ in the 2-D Time-Frequency domain using a 2-D Inverse Symplectic Fourier transform to transform from the delay-Doppler domain to the Time-Frequency domain. These are used as priors to the 2-D Equalizer in the next iteration. In some embodiments, the 2-D transforms used by operation 507 and 517 may be swapped. In other words, an inverse SFFT may be used in the operation 507, while an SFFT may be used in the operation 517.

In some embodiments, the iterative 2-D Equalizer may be operated so that the receiver gets side information about some resource elements in the time-frequency grid that have been "erased" (e.g., not transmitted, or not useable) and the receiver can ignore them. The receiver may skip equalization for these resources and just uses directly the prior estimates as outputs for the equalizer. In this case, Eq (2) simply becomes for these resources: $\hat{X}=\overline{X}$.

3. Self-Iterative 2-D Equalizer (600)

Figure 6:
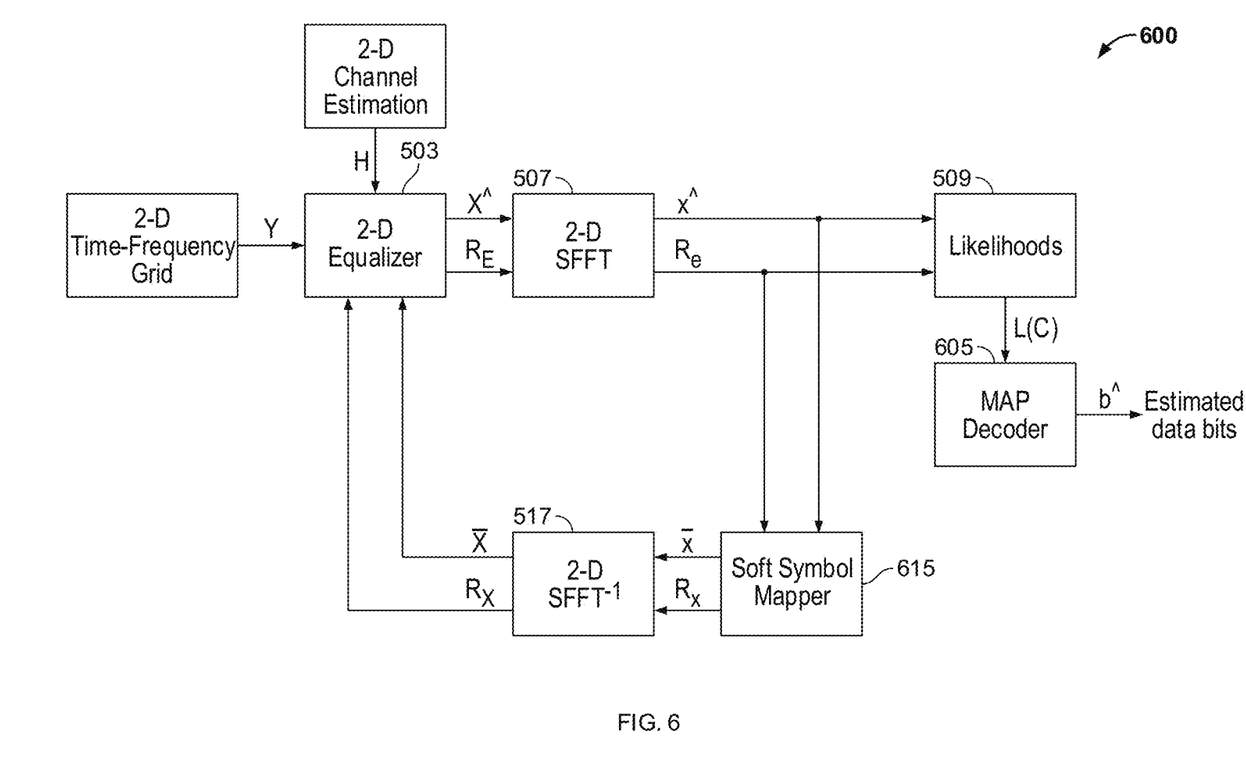
FIG. 6 is a block diagram showing an example of a self-iterative 2-D equalizer.

In the scheme 600, shown in FIG. 6, the 2-D equalizer 503 generates symbols estimations $\hat{x}$ and $R_e$ in the 2-D Delay-Doppler domain in a similar way to the one described in the previous section. However, these estimates are fed directly to the soft symbol mapper 615 to generate along with 2-D inverse Symplectic Fourier transform 517, new priors for the 2-D equalizer 503. After a number of iterations, with termination criteria described as before, these estimations are converted to coded bits likelihoods and passed to the FEC decoder 605 to generate estimation of the information bits.

Figure 2:
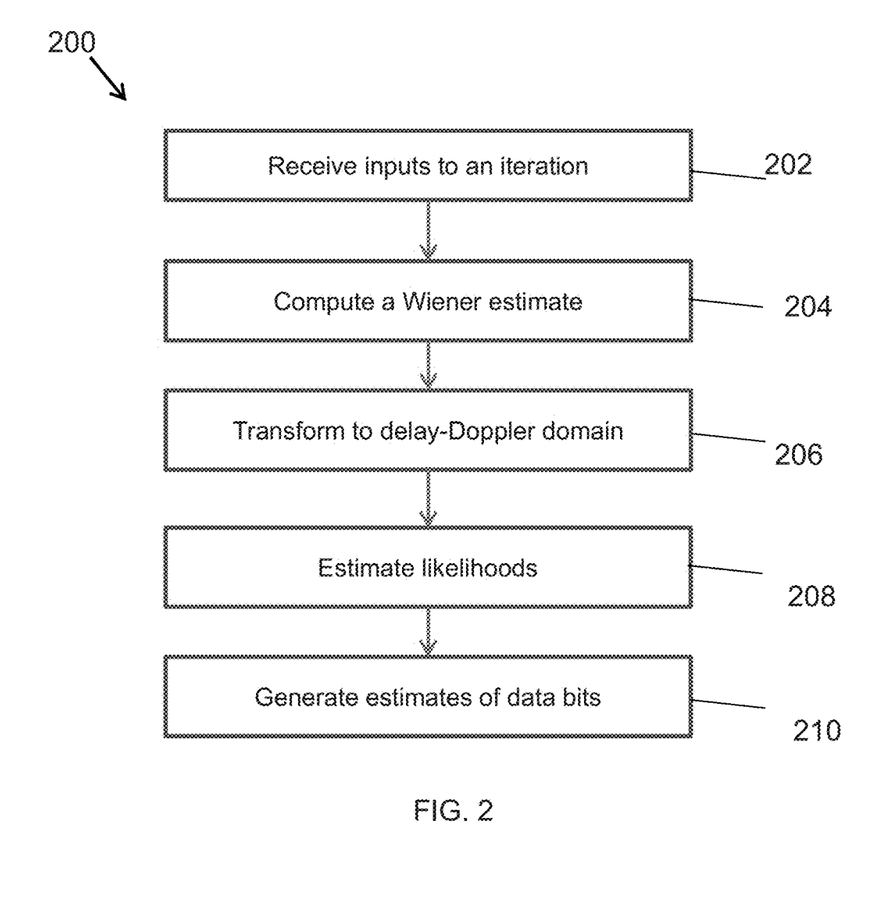
FIG. 2 shows a flowchart of an example wireless communication reception method.

As depicted in the flowchart of FIG. 2, a wireless communication method 200 for recovering information bits from a received signal, by performing iterative two dimensional equalization includes receiving (202), at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing (204), from the iteration inputs, a Wiener estimate of the stream of received symbols, transforming (206) the Wiener estimate to symbol estimates a two dimensional delay-Doppler grid using a two-dimensional symplectic Fourier transform, which may be a fast SFFT or a fast SFFT$^{-1}$, estimating (208) likelihoods of the symbol estimates in the two dimensional delay-Doppler grid, and generating (210) estimates of data from the likelihoods. Various embodiments and options are further described in the description associated with FIG. 5. For example, as described with respect to operations 507 and 517, in some embodiments, two-dimensional symplectic Fourier transforms that are inverse of each other may be used in these operations. In other words, 507 may correspond to an SFFT while 517 may correspond to an inverse SFFT or vice versa.

In some embodiments the generating the estimate may include deinterleaving the likelihoods and performing error correction. As depicted in the example embodiment in FIG. 5, in some embodiments, the feedback direction processing may include generating a symbol estimate and an input autocorrelation matrix estimate for a next iteration of the method 200. The processing in the feedback direction may include performing soft symbol mapping using the likelihoods resulting in intermediate symbol estimates and an intermediate autocorrelation estimate, and generating the symbol estimate and the input autocorrelation matrix estimate by transforming, using an inverse of the two-dimensional symplectic Fourier transform, the intermediate symbol estimates and the intermediate autocorrelation estimate. In various embodiments, the two-dimensional symplectic Fourier transform may be SFFT or SFFT$^{-1}$.

In some embodiments, the receiver that implements the method 200 may get side information about some resource elements in the time-frequency grid that have been "erased" (not transmitted, or not useable) and the receiver can ignore them. The receiver may then skip the equalization for them and just uses directly the prior estimates as outputs for the equalizer. In this case, Eq (2) simply becomes for these resources: $\hat{X}=\overline{X}$.

Figure 3:
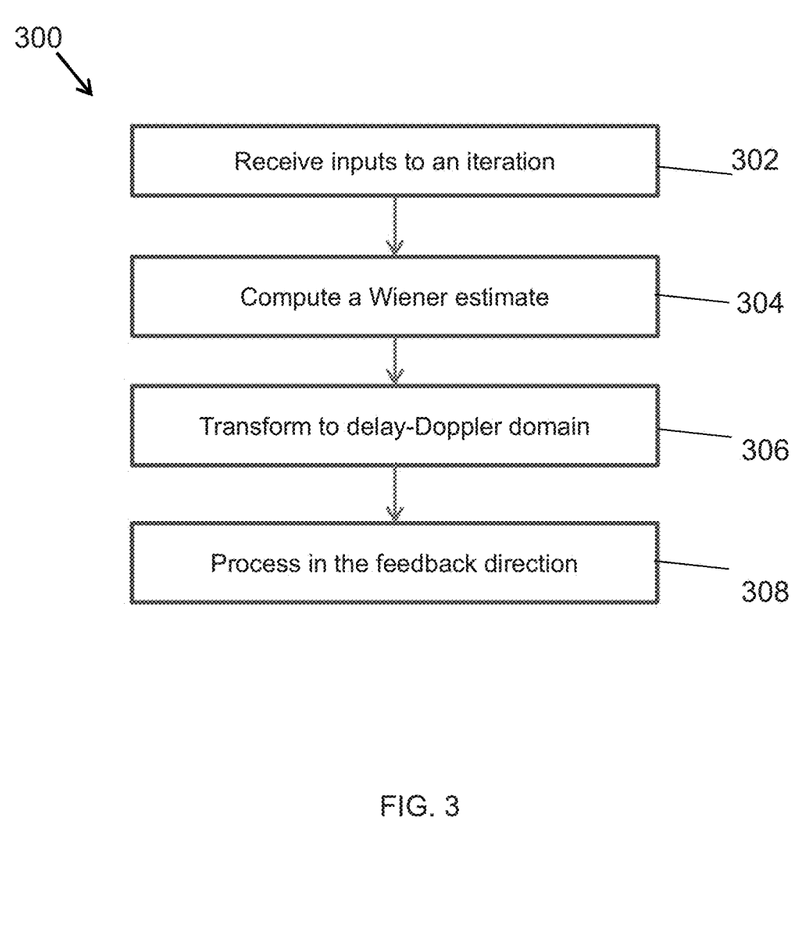
FIG. 3 shows a flowchart of another example wireless communication reception method.

FIG. 3 illustrates a flowchart example for a wireless communication method 300 for recovering information bits from a received signal, by performing iterative two dimensional equalization is disclosed. The method 300 includes receiving (302), at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing (304), from the iteration inputs, a Wiener estimate of the stream of received symbols, transforming (306) the Wiener estimate to symbol estimates a two dimensional delay-Doppler grid using a two-dimensional symplectic Fourier transform, and processing (308) in a feedback direction, by generating a symbol estimate and an input autocorrelation matrix estimate for a next iteration. Various embodiments and options are further described in the description associated with FIG. 6.

Figure 4:
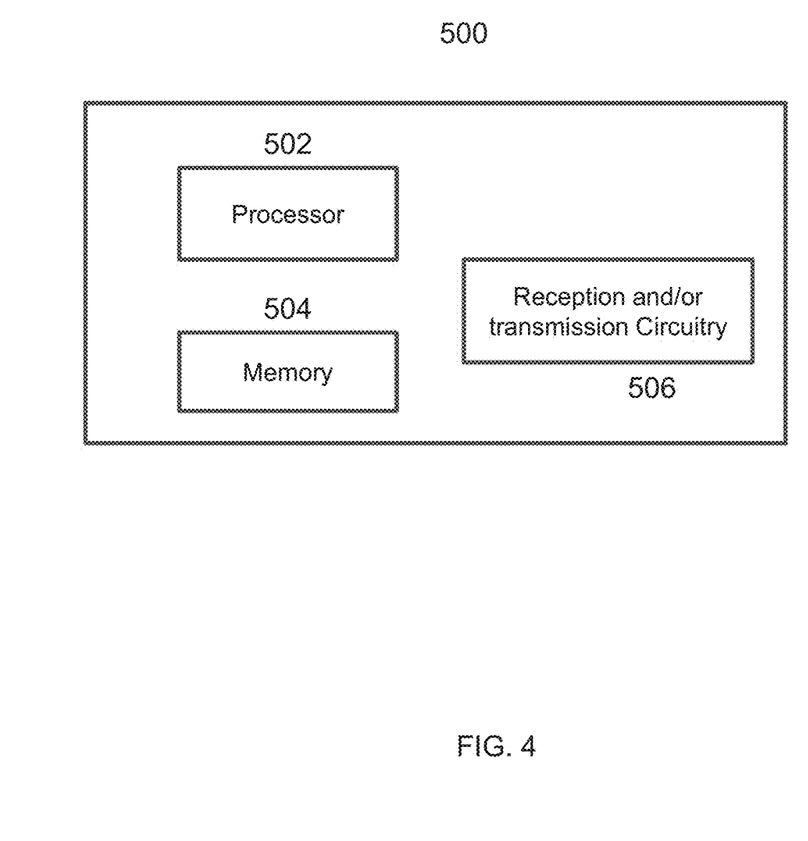
FIG. 4 shows an example of a wireless transceiver apparatus.

FIG. 4 shows an example of a wireless transceiver apparatus 500. The apparatus 500 may be used to implement method 200 or 300. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

It will be appreciated that techniques for wireless data reception are disclosed by performing iterative 2D channel equalization in the delay-Doppler domain.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method for recovering information bits from a received signal, by performing iterative two dimensional equalization, comprising:
   receiving, at an iterative equalizer, iteration inputs including a two dimensional estimate of a wireless channel over which the received signal is received, a stream of received symbols, a symbol estimate from a previous iteration, and an input autocorrelation matrix estimate from the previous iteration, and
   computing, from the iteration inputs, a Wiener estimate of the stream of received symbols;
   transforming the Wiener estimate to symbol estimates in a two dimensional delay-Doppler grid using a two-dimensional symplectic Fourier transform;
   estimating likelihoods of the symbol estimates in the two dimensional delay-Doppler grid; and
   generating estimates of information bits from the likelihoods.

2. The method of claim 1, wherein the generating the estimates includes:
   deinterleaving the likelihoods of the symbols; and
   performing error correction on an output of the deinterleaving.

3. The method of claim 1, further including, processing in a feedback direction, by generating a symbol estimate and an input autocorrelation matrix estimate for a next iteration.

4. The method of claim 3, wherein the processing in the feedback direction includes:
   performing soft symbol mapping using the likelihoods resulting in intermediate symbol estimates and an intermediate autocorrelation estimate; and
   generating the symbol estimate and the input autocorrelation matrix estimate by transforming, using an inverse of the two-dimensional symplectic Fourier transform, the intermediate symbol estimates and the intermediate autocorrelation estimate.

5. The method of claim 1, wherein the two-dimensional symplectic Fourier transform is a symplectic fast Fourier transform (SFFT).

6. The method of claim 1, wherein the computing the Wiener estimate comprises:
   receiving information about erased time-frequency resource elements from the received signal; and
   using prior symbol estimates from a feedback direction as outputs of the computing the Wiener estimates.

7. A wireless communication method for recovering information bits from a received signal, by performing iterative two dimensional equalization, comprising:
   receiving, at an iterative equalizer, iteration inputs including a two dimensional estimate of a wireless channel over which the received signal is received, a stream of received symbols, a symbol estimate from a previous iteration, an input autocorrelation matrix estimate from the previous iteration, and
   computing, from the iteration inputs, a Wiener estimate of the stream of received symbols;
   transforming the Wiener estimate to symbol estimates a two dimensional delay-Doppler grid using a two-dimensional symplectic Fourier transform; and
   processing in a feedback direction, by generating a symbol estimate and an input autocorrelation matrix estimate for a next iteration.

8. The method of claim 7, further including:
   estimating likelihoods of the symbol estimates in the two dimensional delay-Doppler grid and
   generating estimates of data from the likelihoods.

9. The method of claim 7, wherein the generating the estimates includes
deinterleaving the likelihoods of the symbols; and
performing error correction on an output of the deinterleaving.

10. The method of claim 9, wherein the processing in the feedback direction includes:
performing soft symbol mapping using the likelihoods resulting in intermediate symbol estimates and an intermediate autocorrelation estimate; and
generating the symbol estimate and the input autocorrelation matrix estimate by transforming, using an inverse of the two-dimensional symplectic Fourier transform, the intermediate symbol estimates and the intermediate autocorrelation estimate.

11. The method of claim 7, wherein the two-dimensional symplectic Fourier transform is a symplectic fast Fourier transform (SFFT).

12. The method of claim 7, wherein the computing the Wiener estimates comprises:
receiving information about erased time-frequency resource elements from the received signal; and
using prior symbol estimates from a feedback direction as outputs of the computing the Wiener estimates.

13. A wireless transceiver apparatus comprising a processor, transmission and reception circuitry and a memory, the apparatus configured to perform a method for recovering information bits from a received signal, the method comprising:
receiving, at an iterative equalizer, iteration inputs including a two dimensional estimate of a wireless channel over which the received signal is received, a stream of received symbols, a symbol estimate from a previous iteration, and an input autocorrelation matrix estimate from the previous iteration, and
computing, from the iteration inputs, a Wiener estimate of the stream of received symbols;
transforming the Wiener estimate to symbol estimates in a two dimensional delay-Doppler grid using a two-dimensional symplectic Fourier transform;
estimating likelihoods of the symbol estimates in the two dimensional delay-Doppler grid; and
generating estimates of information bits from the likelihoods.

14. The apparatus of claim 13, further configured to:
deinterleave the likelihoods of the symbols; and
perform error correction on an output of the deinterleaving.

15. The apparatus of claim 13, further configured to process in a feedback direction, by generating a symbol estimate and an input autocorrelation matrix estimate for a next iteration.

16. The apparatus of claim 15, wherein the processing in the feedback direction includes:
performing soft symbol mapping using the likelihoods resulting in intermediate symbol estimates and an intermediate autocorrelation estimate; and
generating the symbol estimate and the input autocorrelation matrix estimate by transforming, using an inverse of the two-dimensional symplectic Fourier transform, the intermediate symbol estimates and the intermediate autocorrelation estimate.

17. The apparatus of claim 13, wherein the processing in the feedback direction includes:
performing soft symbol mapping using the likelihoods resulting in intermediate symbol estimates and an intermediate autocorrelation estimate; and
generating the symbol estimate and the input autocorrelation matrix estimate by transforming, using an inverse of the two-dimensional symplectic Fourier transform, the intermediate symbol estimates and the intermediate autocorrelation estimate.

18. A non-transitory computer readable storage medium having code stored thereupon, the code, when executed, causing a processor to implement a method recovering information bits from a received signal by performing iterative two dimensional equalization, comprising:
receiving, at an iterative equalizer, iteration inputs including a two dimensional estimate of a wireless channel over which the received signal is received, a stream of received symbols, a symbol estimate from a previous iteration, an input autocorrelation matrix estimate from the previous iteration, and
computing, from the iteration inputs, a Wiener estimate of the stream of received symbols;
transforming the Wiener estimate to symbol estimates a two dimensional delay-Doppler grid using a two-dimensional symplectic Fourier transform; and
processing in a feedback direction, by generating a symbol estimate and an input autocorrelation matrix estimate for a next iteration.

19. The non-transitory computer readable storage medium of claim 17, wherein the method further includes:
estimating likelihoods of the symbol estimates in the two dimensional delay-Doppler grid and
generating estimates of data from the likelihoods.

20. The non-transitory computer readable storage medium of claim 19, wherein the generating the estimates includes
deinterleaving the likelihoods of the symbols; and
performing error correction on an output of the deinterleaving.

21. The non-transitory computer readable storage medium of claim 18, wherein the processing in the feedback direction includes:
performing soft symbol mapping using the likelihoods resulting in intermediate symbol estimates and an intermediate autocorrelation estimate; and
generating the symbol estimate and the input autocorrelation matrix estimate by transforming, using an inverse of the two-dimensional symplectic Fourier transform, the intermediate symbol estimates and the intermediate autocorrelation estimate.

22. The non-transitory computer readable storage medium of claim 18, wherein the two-dimensional symplectic Fourier transform is a symplectic fast Fourier transform (SFFT).

23. The non-transitory computer readable storage medium of claim 18, wherein the computing the Wiener estimates comprises:
receiving information about erased time-frequency resource elements from the received signal; and
using prior symbol estimates from a feedback direction as outputs of the computing the Wiener estimates.

\* \* \* \* \*